(12) United States Patent
Rosse et al.

(10) Patent No.: US 10,790,673 B2
(45) Date of Patent: Sep. 29, 2020

(54) POWER CONTROL OF INVERTERS OF A PHOTOVOLTAIC FACILITY IN ORDER TO PARTICIPATE IN FREQUENCY REGULATION OF THE ELECTRICAL DISTRIBUTION NETWORK

(71) Applicant: ELECTRICITE DE FRANCE, Paris (FR)

(72) Inventors: Antoine Rosse, Palaiseau (FR); Gauthier Delille, Longpont-sur-Orge (FR)

(73) Assignee: ELECTRICITE DE FRANCE, Paris (FR)

( * ) Notice: Subject to any disclaimer, the term of this patent is extended or adjusted under 35 U.S.C. 154(b) by 0 days.

(21) Appl. No.: 16/468,426

(22) PCT Filed: Nov. 24, 2017

(86) PCT No.: PCT/EP2017/080320
§ 371 (c)(1),
(2) Date: Jun. 11, 2019

(87) PCT Pub. No.: WO2018/108481
PCT Pub. Date: Jun. 21, 2018

(65) Prior Publication Data
US 2019/0305561 A1    Oct. 3, 2019

(30) Foreign Application Priority Data
Dec. 12, 2016  (FR) ..................... 16 62323

(51) Int. Cl.
*H02J 3/38*  (2006.01)
*G05F 1/67*  (2006.01)
(Continued)

(52) U.S. Cl.
CPC .............. *H02J 3/385* (2013.01); *G05F 1/67* (2013.01); *H02J 3/04* (2013.01); *H02J 3/383* (2013.01);
(Continued)

(58) Field of Classification Search
CPC .... H02J 3/385; H02J 3/04; H02J 3/383; H02J 3/46; G05F 1/67
(Continued)

(56) References Cited

U.S. PATENT DOCUMENTS

2011/0221276 A1*  9/2011  Geinzer .................... H02J 3/32
                                                             307/66
2012/0262960 A1*  10/2012  Giraut Ruso ............. H02J 3/48
                                                             363/71
(Continued)

FOREIGN PATENT DOCUMENTS

EP    2 490 312 A1    8/2012
FR    3 041 836 A1    3/2017
(Continued)

*Primary Examiner* — Mohammad Ali
*Assistant Examiner* — Joshua T Sanders
(74) *Attorney, Agent, or Firm* — Faegre Drinker Biddle & Reath LLP (57) ABSTRACT

The disclosure relates to controlling electricity production by a facility of photovoltaic panels in order to establish a power reserve. A method is carried out iteratively and includes: issuing respective setpoints to a number k of inverters among the set of N inverters, so that each produces a maximum power, where k<N, the k inverters being determined for a given iteration of the method, and obtaining, from the k inverters, measurements of the maximum power respectively produced by the k inverters and storing these measurements in memory with N-k other measurements obtained from N-k additional inverters during preceding iterations of the method; estimating, by reading the contents of the memory, a total maximum power able to be produced (Continued)

by the set of N inverters of the facility, and obtaining information relating to an amount of reserve power to be established, and determining an overall power to be produced.

12 Claims, 6 Drawing Sheets

(51) Int. Cl.
  *H02J 3/04* (2006.01)
  *H02J 3/46* (2006.01)
(52) U.S. Cl.
  CPC ............... *H02J 3/46* (2013.01); *Y02E 10/563* (2013.01); *Y02E 10/58* (2013.01); *Y02P 80/25* (2015.11)

(58) Field of Classification Search
  USPC .......................................................... 700/286
  See application file for complete search history.

(56) References Cited

U.S. PATENT DOCUMENTS

| 2013/0093250 A1* | 4/2013 | O'Brien | H02J 3/383 |
| | | | 307/82 |
| 2013/0289783 A1* | 10/2013 | Hauf | H02J 7/0024 |
| | | | 700/286 |

FOREIGN PATENT DOCUMENTS

| WO | 2009/060273 A1 | 5/2009 |
| WO | 2015/123549 A1 | 8/2015 |

* cited by examiner

POWER CONTROL OF INVERTERS OF A PHOTOVOLTAIC FACILITY IN ORDER TO PARTICIPATE IN FREQUENCY REGULATION OF THE ELECTRICAL DISTRIBUTION NETWORK

CROSS-REFERENCE TO RELATED APPLICATIONS

This application is the U.S. national phase of the International Patent Application No. PCT/EP2017/080320 filed Nov. 24, 2017, which claims the benefit of French Application No. 16 62323 filed Dec. 12, 2016, the entire content of which is incorporated herein by reference.

FIELD

The disclosure relates to the management of a photovoltaic facility for generating electricity, comprising a plurality of inverters ensuring the connection between the photovoltaic panels of the facility and an electricity distribution network.

BACKGROUND

It relates in particular to a method enabling such facilities to participate in regulating the frequency of the network, without the use of an electrical energy storage means and without modifying the internal control of the inverters currently commercially available.

Currently, at least in France, the services needed to adjust the frequency (nominal frequency of 50 Hz in France) are mainly carried out by conventional producers (responsible for generating hydropower, nuclear power, etc.). Producers of the type of energy commonly called "renewable energy" (wind, photovoltaic, etc.) are exempted.

These frequency regulation services are intended to help stabilize the frequency of the network around a nominal frequency (50 Hz in France). To achieve this, some producers (particularly the conventional producers in France) are asked to:

increase the power when under-frequency is observed in the network (symptomatic of under-production or over-consumption in the system), reduce the power when over-frequency is observed (symptomatic of excess production or under-consumption).

A conventional producer can proceed by setting the nominal setpoint of its facility below the maximum power of the power station. For example, when the frequency is below its nominal value of 50 Hz, for example 49.8 Hz, then it is desired that the facility produce more electrical energy (more accurately more active power) to compensate for the under-production and to ensure that the frequency of the network returns to its nominal value of 50 Hz. Conversely, producers may be asked to temporarily reduce their production when over-frequency is observed in the network (frequency above the nominal frequency, for example 50.2 Hz instead of 50 Hz in France, symptomatic of over-production of electrical energy in the system).

In addition, dynamic frequency support by very quickly releasing from the reserve makes it possible to improve the quality of the supply in sensitive networks, such as island systems, by occurring very quickly after a disruption.

Today, in France at least, producers of renewable energies (wind, photovoltaic, etc.) are exempted from participating in frequency regulation.

Thus, photovoltaic facilities are usually managed so that the photovoltaic panels are extracting the maximum available solar power at all times. This management is done by the internal control of each inverter, with algorithms that make it possible to find the optimal operating point of the solar panel (current, voltage) in order to extract the maximum power possible. The type of algorithm usually used to achieve this control is called "Maximum Power Point Tracking" ("MPPT" below) and consists of finding the maximum power provided by each panel, as a function of the voltage applied to its terminals. The associated operating point is called the "Maximum Power Point" ("MPP" below). However, with the massive growth of renewable energies in power grids, the new facilities (comprising those that are "renewable energy") are increasingly being asked to participate in dynamic frequency support and/or regulation.

In the case of over-frequency, solutions exist to temporarily reduce the power generated by renewable energy producers. These solutions only allow participating in a "downward" reserve (in other words, reducing production when the frequency increases). In the case of producers using wind energy for example, it is possible to control the mechanical speed of the turbines or the pitch angle of the blades of wind turbines in order to reduce the power produced.

In the case of photovoltaic facilities, it is possible to reduce the power produced by moving away from the voltage corresponding to the operating point MPP of the panels supplying it. Such an embodiment is proposed in French Patent Application No. FR 15 59128 filed in the name of the applicant. However, this strategy involves the internal control of the inverter connected to a photovoltaic panel or a group of photovoltaic panels. But the inverter is generally locked by the manufacturer so that it can only be used as a "black box" by the operator.

On the other hand, many commercial inverters allow power management, meaning that the operator can send an active power setpoint $P_{cons}$ to the inverter, and this power will be produced as output from the inverter (with a certain accuracy and a certain delay) as long as this power remains lower than the $P_{MPP}$ corresponding to its MPP. If the power setpoint $P_{cons}$ is greater than the $P_{MPP}$ of the inverter, then the power produced will be limited to the maximum power available, in other words the power $P_{MPP}$ (called "MPP" below). Specifically, an operator of a photovoltaic inverter can reduce the power produced by sending a power setpoint that is lower than the MPP of the inverter. This power $P_{cons}$ can thus be considered as an active power limitation setpoint.

In order to be able to support the network in the event of a decrease in frequency, one can maintain an "upward" reserve, and thus maintain a margin between the power available and the power actually injected into the network. The variability of the primary resources (wind, sun, etc.) makes it particularly difficult to establish this reserve.

The technical solution often adopted to respond to this difficulty and to contribute to the dynamic frequency support and/or regulation is to add a storage device within the facility. However, this solution has the major disadvantage of the additional investment to be made in such a storage device.

The present disclosure improves this situation.

SUMMARY

For this purpose, an intrinsic modification of the operation of photovoltaic inverters and therefore a modification of the usual modes for their management are proposed. According to a first aspect, the disclosure proposes a method, implemented by computer means, for controlling the electric power produced by a facility of photovoltaic panels in order to establish a power reserve, the facility comprising a set of N inverters for managing the power produced by said photovoltaic panels, the method, carried out iteratively on successive inverters among the set of N inverters, comprising:

issuing respective setpoints to a number k of inverters among the set of N inverters, so that each produces a maximum power, the number k being less than the number N and the k inverters being determined for a given iteration of the method, obtaining, from the k inverters, measurements of the maximum power respectively produced by the k inverters and storing in memory said measurements for the k inverters, said memory further storing N-k measurements obtained from N-k additional inverters during at least one prior iteration of the method, estimating, by reading the contents of the memory, a total maximum power able to be produced by the set of N inverters of the facility, obtaining information relating to an amount of reserve power to be established, and determining an overall power to be produced such that the difference between said overall power and said total maximum power corresponds to said amount of reserve power to be established, maintaining the setpoints of the k inverters so as to produce a maximum power, and issuing respective setpoints to N-k additional inverters in order to produce a target power that is less than a maximum power, so that the sum of the N-k target powers and of the k maximum powers corresponds to said overall power to be produced, selecting from the N inverters one or more next inverters to replace the k inverters in a next iteration of the method.

The present disclosure thus simply uses the current capability of known inverters to determine their operating point for delivering maximum power, which thus makes it possible to determine the possible power reserve for the facility by cyclic determinations of the maximum powers of all the inverters. Some of these inverters (k inverters) are then managed so that they reach this maximum power while the other inverters (N-k inverters) can participate in establishing the reserve, and this is done successively (for example by circular permutation). The disclosure therefore only requires a computer device communicating with the inverters to manage their operation according to such a method.

In one advantageous embodiment, a delay is applied between the issuing of the setpoints to the k inverters and the obtaining of the maximum power measurements of the k inverters, in order to take into account a latency in the search by each inverter for the maximum power that can be produced. This search typically can be a pre-existing routine (called "MPPT") described in more detail below.

In one embodiment, each setpoint issued to the k inverters for reaching the maximum power comprises a time ramp setpoint to be respected, in order to have a gradual increase in the power produced by each of the k inverters. Such an embodiment avoids spikes, in the power produced, that exceed a setpoint to be respected for the overall power, as will be seen below.

In one embodiment, before issuing a target power setpoint to a given inverter, it is verified that said given inverter has received a maximum power production setpoint in the previous iteration of the method, and where appropriate the target power setpoint for this given inverter comprises a time ramp setpoint to be respected in order to have a gradual decrease in the power produced by this given inverter until the target power is reached. Here again, such an embodiment makes it possible to avoid unwanted reductions in power production, to below a setpoint to be respected for the overall power.

In this embodiment, combined with the previous one, the upward and downward ramps are advantageously chosen so as to maintain, across the set of N inverters, an overall produced power corresponding to said overall power to be produced. This precaution makes it possible to smooth the overall power produced by making it conform to the setpoint for the calculated overall, as will be seen in particular in FIG. 4B, described below.

In one embodiment, each target power setpoint is determined so as to keep the same difference between the target power and the maximum power for all N-k additional inverters. Such an embodiment makes it possible to distribute the reserve to be established, across the N-k inverters which are not at their maximum power produced.

In one embodiment, said power reserve of the facility is established in order to release all or part of said reserve as a function of a frequency deviation from a nominal frequency of an electricity distribution network to which the inverters are connected. In particular, said information relating to an amount of reserve power to be established may be a directly measured value of the frequency of the distribution network, the amount of reserve power to be established being calculated on this basis.

Alternatively, this information relating to an amount of reserve power to be established may be a reserve-establishment setpoint received from a managing entity of the distribution network.

In one embodiment, in a next iteration of the method, k next inverters are selected from the N inverters in order to replace k previous inverters of a previous iteration (thus maintaining the same number k from one iteration to the next). Typically, a cyclic permutation of k inverters among the N inverters can be provided at each iteration.

Figure 3:
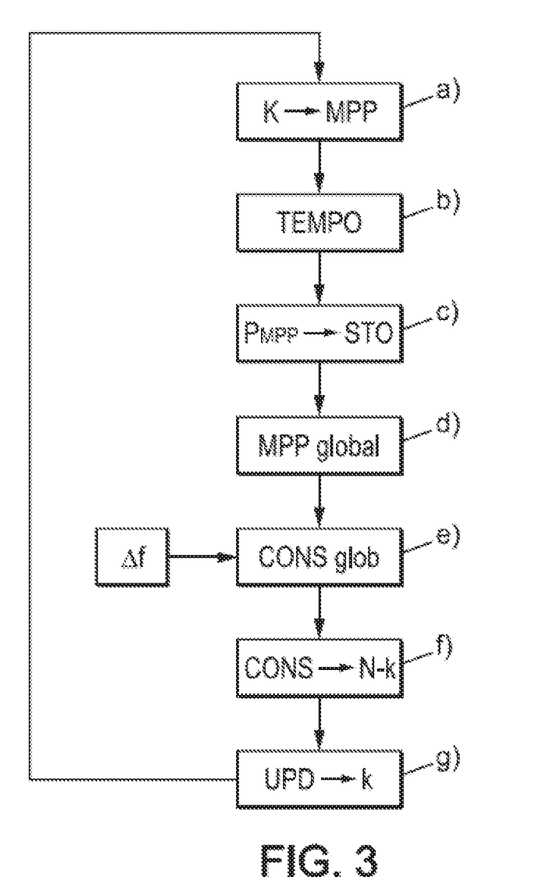
FIG. 3 illustrates the main steps of a method in an exemplary embodiment.
Figure 5:
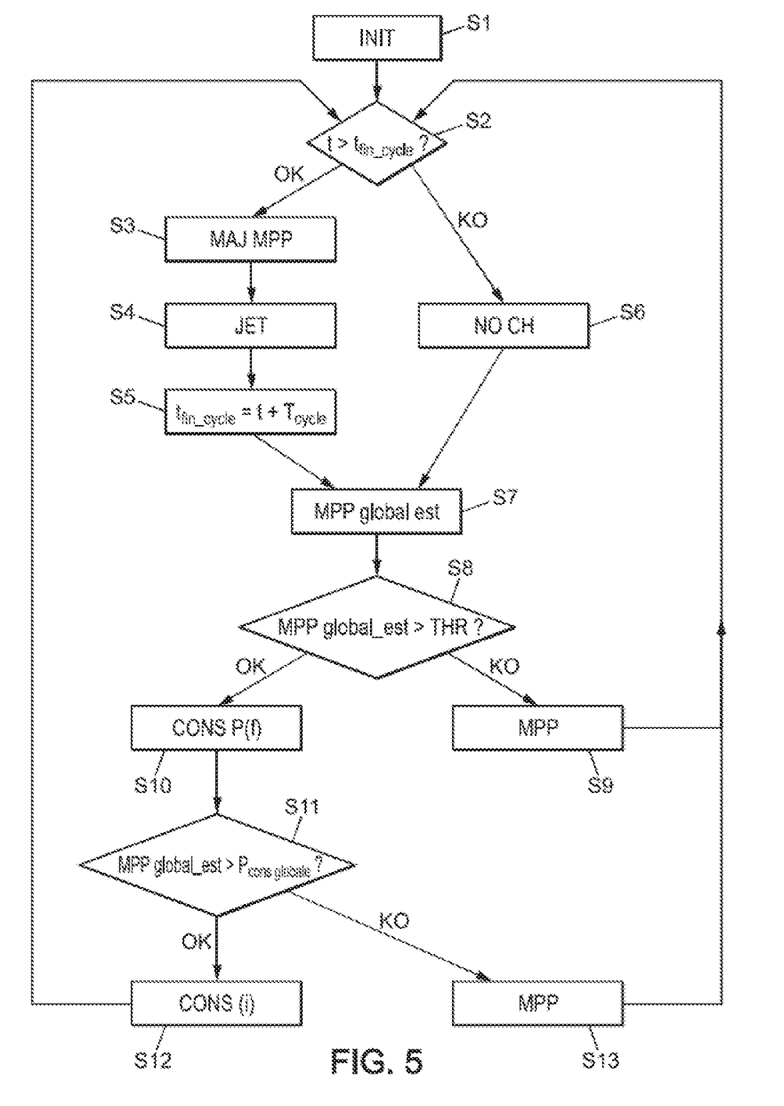
FIG. 5 illustrates a detailed flowchart of an exemplary embodiment of a method according to the disclosure.
Figure 6:
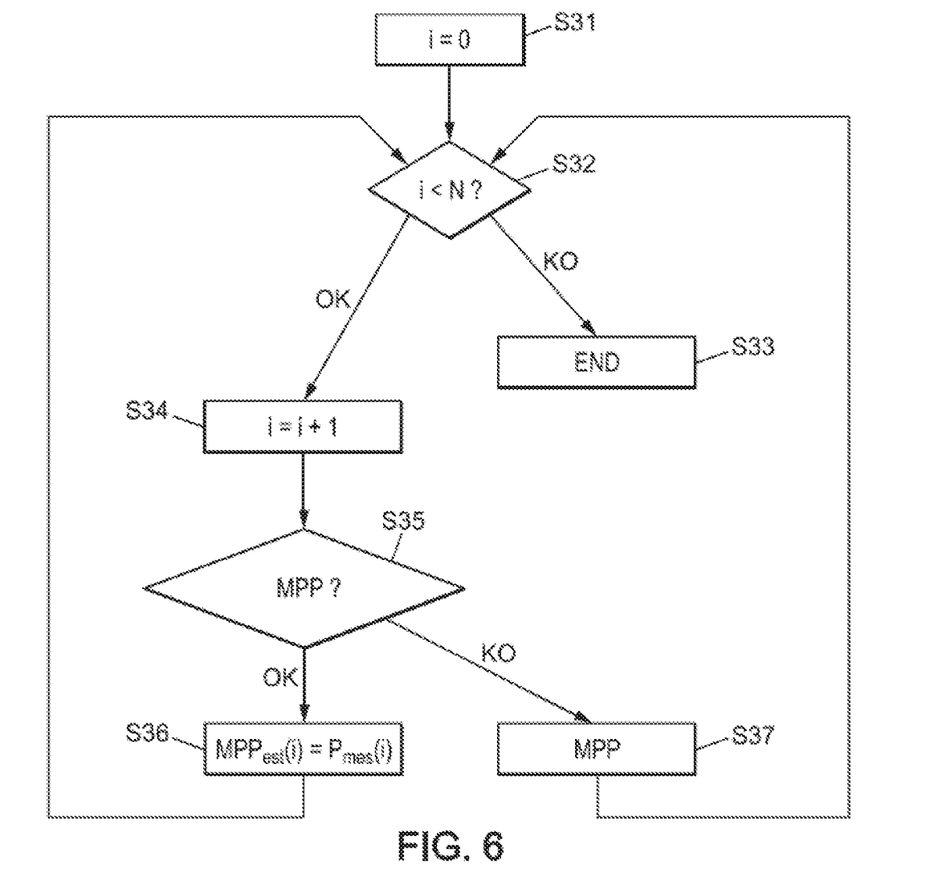
FIG. 6 illustrates details in implementing step S3 of FIG. 5.
Figure 7:
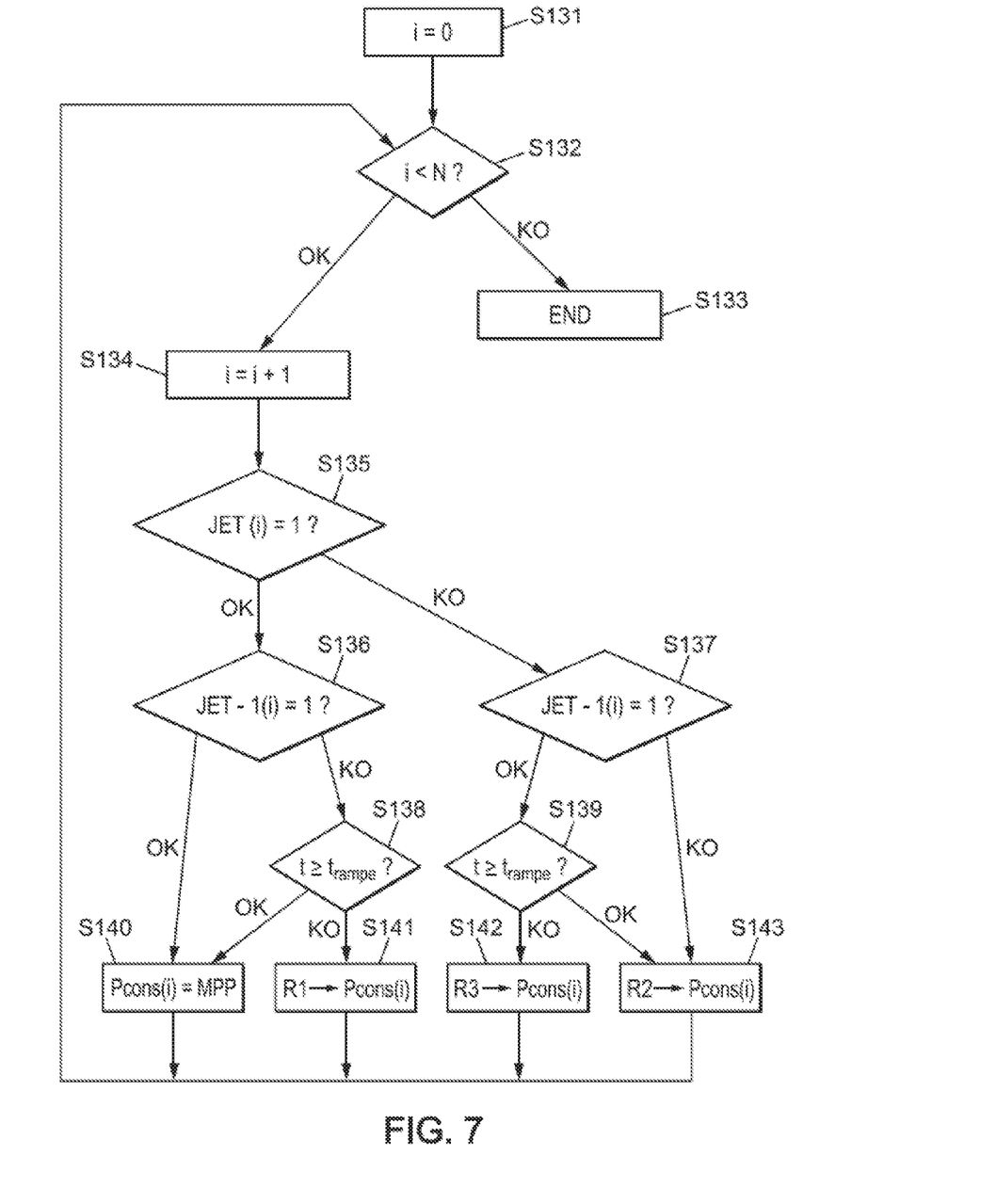
FIG. 7 illustrates details in implementing step S12 of FIG. 5.

The present disclosure also relates to a computer program (and its memory medium) comprising instructions for implementing the above method when this program is executed by a processor. FIGS. 3 and 5 are possible flowcharts for the general algorithm of such a program. FIGS. 6 and 7 are possible flowcharts of particular subroutines of this general algorithm.

Figure 2:
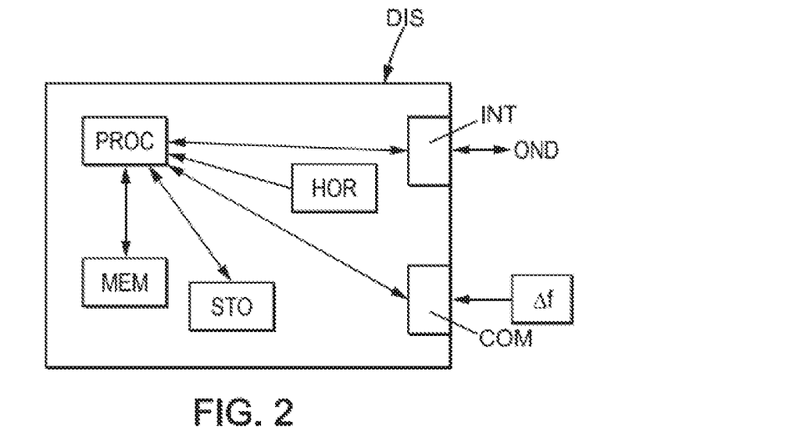

The present disclosure also relates to a computing device having a processing circuit comprising a processor for implementing the above method. As illustrated in FIG. 2 and described in detail below, the processing circuit further comprises at least:

an interface (INT) for communicating with the inverters, and
a memory (STO) for storing the measurements of the maximum powers successively produced by the inverters.

The method thus makes it possible to manage the active power setpoints of each inverter of the system, on the basis of:

active power measurements of each inverter, practically in real time, and
a real-time frequency measurement of the distribution network at the connection point (and/or of a control signal coming from a network management entity).

This method enables pre-existing photovoltaic facilities to be adapted to contribute to frequency regulation, without replacing the current inverters or providing new sensors.

BRIEF DESCRIPTION OF THE DRAWINGS

Other features and advantages will be apparent from reading the following detailed description of some exemplary embodiments, and from examining the accompanying drawings in which.

DETAILED DESCRIPTION

Figure 1:
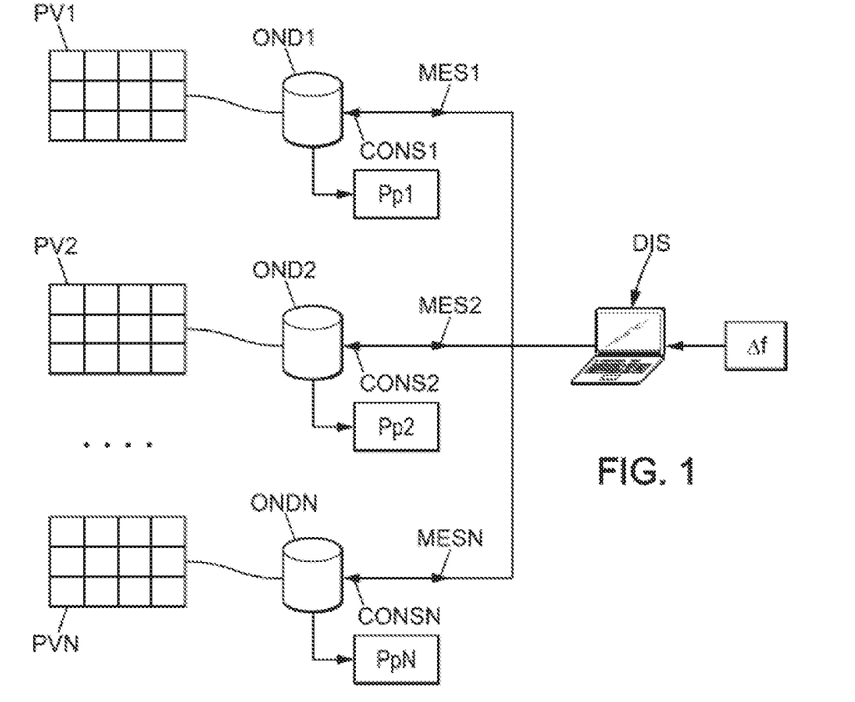
FIG. 1 illustrates a facility with photovoltaic panels managed by inverters, communicating with a device according to an embodiment, FIG. 2 schematically illustrates a device according to an embodiment.

The present disclosure relates to the management of a facility of photovoltaic panels as illustrated in FIG. 1. The facility comprises a plurality of photovoltaic panels connected in groups PV1, PV2, PVN to respective inverters OND1, OND2, ONDN. The panels produce electricity by photovoltaic effect, and the power Pp1, Pp2, PpN output from each inverter to which they are connected can be managed by a computing device DIS (such as a computer). For this purpose, the device DIS can issue a setpoint CONS1, CONS2, CONSN for each inverter OND1, OND2, ONDN. In particular, this setpoint for an inverter may be a maximum power produced $P_{MPP}$. Once this power value $P_{MPP}$ is reached by an inverter, the inverter usually transmits to the device DIS the maximum power reached $P_{MPP}$. Thus, at any time the device DIS can know a measurement of this maximum achievable power $P_{MPP}$. This value $P_{MPP}$ is variable and of course depends on sunlight conditions (it is greater when there is more sunlight). The value $P_{MPP}$ transmitted by each inverter to the device DIS thus represents a measurement (arrows MES1, MES2, MESN) at a current time of the maximum power that can be reached and that can be delivered by this inverter (and thus depending on the degree of sunlight at that current time).

More specifically, the inverters are usually managed so that their photovoltaic panels are extracting the maximum available solar power at all times. The type of control algorithm usually used to achieve this management is called "Maximum Power Point Tracking" ("MPPT") and consists of finding the maximum power provided by each panel, on the basis of the voltage applied to its terminals. The associated operating point is called the "Maximum Power Point" ("MPP"). It is also possible to reduce ("curb") the power produced by an inverter by moving away from the voltage corresponding to the operating point MPP of the panels supplying it. In this case, the power produced Pp is less than the power $P_{MPP}$. In practice, the algorithms for controlling the operating point of the photovoltaic panels are integrated into a control-command unit of commercially available inverters, and locked by the manufacturers. The inverter therefore behaves as a "black box" for the user, with a limited choice of external management modes. Even so, most inverters offer at least two management modes:

MPP management: the inverter operates in MPP mode to deliver the maximum power $P_{MPP}$ at the current time and uses an MPPT-type algorithm to extract the maximum power at all times, Power setpoint (Pcons) management: the inverter receives a power setpoint, for example from an external device, and tries to achieve this setpoint. If there is sufficient solar power available, the inverter then looks for an operating point of the photovoltaic panel that enables achieving the requested power setpoint (for example by modifying the voltage at the panel terminals relative to the voltage giving the maximum power $P_{MPP}$). In this case the inverter can be considered to be "curbed" because it does not make maximum use of the panel and therefore does not extract the maximum power available. However, it does provide a power corresponding to the setpoint sent to it. On the other hand, if the power setpoint sent to the inverter is greater than the solar power available, the inverter tries to operate at the maximum available power, in other words in MPP management, as long as this maximum available power remains below the setpoint.

In the context of the present disclosure, it is considered that the inverters can each receive:

a power setpoint which allows curbing the power of the panel if the available power so allows, and a command to operate at MPP, and thus to find the maximum power point by means of MPPT-type algorithms implemented in the internal controller of the inverter.

The disclosure then proposes taking advantage of these possible modes of operation to establish a reserve of electrical power generated by the panels and thus to contribute to balancing the frequency of the electrical distribution network (as is the goal described in French Patent Application No. FR 15 59128). For example, this involves correcting a frequency deviation Δf from a nominal frequency (50 Hz in France). In principle, the higher the frequency (Δf>0), the greater the need to reduce the power produced. The lower the frequency (Δf<0), the greater the need to release the reserve of power produced. In an extreme case where Δf<0, the inverters can be controlled to deliver the maximum power $P_{MPP}$ of all the inverters.

For this purpose, the device obtains a current value for the frequency of the network, or a deviation from its nominal value Δf. To obtain this data, with reference to FIG. 2, the device DIS may receive (or alternatively directly measure) the value Δf via a communication interface COM. The device further comprises a processor PROC and a permanent memory MEM. This memory MEM can typically store instruction code of the computer program in the sense of the disclosure. The instruction code can be read by the processor PROC in order to execute the method according to the disclosure (described in detail below). The device may further comprise a working memory STO for storing temporary data, in particular the maximum powers $P_{MPP}$ that the inverters send to the device via the communication interface INT with the inverters, which can also be used to send the power production setpoints to the inverters. It should be noted that the memories MEM and STO may be the same memory unit of the device. In addition, particularly for an optional step (but advantageous for timing) of the method presented below, the device may include an internal clock HOR.

In particular, the desire is to build up the power reserve in the photovoltaic facility and optimize the establishing of it, in a manner that limits lost production potential and maximizes reserve availability. The disclosure thus concerns a method, implemented by computer means (typically the device DIS), for controlling the production of power from photovoltaic panels by sending precisely calculated active power setpoints to the individual inverters of a facility (called a "power station" below), in order to have at all times an estimate of the maximum power available from the power station (called the "overall MPP" of the power station) and to be able to reach a setpoint for the overall power that is less than or equal to the overall MPP. This method does not involve any modification to the internal controllers of the inverters (algorithm artificially shifting the MPP, for example, as described in French Patent Application No. FR 15 59128), which can be considered as "black box" systems with a power setpoint as input and an achieved and measured power as output. The method can be compatible with existing facilities using commercially available inverters, provided that the inverters can receive power setpoints from an external device (for example a programmable logic controller (PLC), a computer, etc.), and that their response time to these setpoints is sufficiently short (typically less than 5 seconds).

One embodiment of the method can be described by the steps illustrated in FIG. 3, implemented cyclically for a facility comprising a total number N of inverters:
a) Send a command to a number k of inverters among the set of N inverters (k greater than or equal to 1 but less than N), to produce their maximum power (setpoint to go to the MPP),
b) Apply a chosen delay (so that the search for the MPP by the search algorithm internal to these inverters has converged to the MPP point and the powers produced by these inverters are indeed the respective MPP powers),
c) Measure the powers produced by the k inverters at their maximum power and record these values (these power values indicate the MPP of these inverters at that moment and are stored in memory for use as estimates of the current MPPs of these inverters if they are subsequently curbed),
d) Calculate an estimate of an overall maximum power (called overall MPP) capable of being produced by the facility (by summing the stored MPP estimates for the set of N individual inverters),
e) Possibly in parallel with steps a) to d), obtain data on the frequency of the electricity transmission network and calculate an overall power setpoint for releasing all or part of the reserve of the facility based on a frequency deviation relative to a nominal frequency (hereinafter denoted Δf (this frequency of the network, and therefore its deviation, may be measured directly by the facility or alternatively may be received in the form of a command to release all or part of the reserve, for example in a signal received by the facility, and coming from a network management entity for example),
f) Send power setpoints to the (N-k) inverters (inverters of the facility which are not at their MPP), to curb their power (more or less instantly) so that the total power of the facility follows the overall power setpoint (less than or equal to the overall MPP of the facility): these inverters thus carry out the active power adjustment or the work of regulating the facility to the network frequency, while the k other inverters are at their MPP,
g) Repeat the previous steps, while modifying the inverters which are at the MPP and those which are curbed (by choosing k next inverters for example among the N inverters): the inverters can thus each in turn go to the MPP and update the estimated value of the MPP of each inverter, cyclically or according to advanced alternative strategies, while maintaining the reserve in the rest of the inverters which are thus curbed in power.

Step f) can be carried out in different ways: the (N-k) inverters may all have the same individual power setpoint, or alternatively may have different individual power setpoints from one inverter to another, but have the same goal of producing a total power of the facility that complies with the overall power setpoint. Typically, some of the (N-k) inverters may for example be at their MPP, while others may be below it.

Thus, a general reserve is established at the power station by placing, at each moment, a selected number N-k of inverters at a power less than or equal to their MPP, by sending them power setpoints that are less than or equal to the estimates of their respective MPPs. The MPP estimates are cyclically updated to ensure rotation between the inverters that are at the MPP and those that are ensuring the function of establishing the reserve. An estimate of the overall MPP of the power station can thus be known at any time (by taking all MPP values measured and recorded one after another for the set of N inverters). The overall power can then be controlled to provide the reserve and to adjust the frequency of the network, without the need for sensors other than the usual power sensors of the inverters (commercial inverters already having these sensors). All that is required is a network frequency sensor at the power station's point of connection, or simply a communication module for receiving an external regulation signal (for example a signal coming from a network management entity). No modification to the internal controllers of the inverters and no prior knowledge of the behavior of the panels are required.

As an illustrative example, in the simple case of a facility consisting of three inverters, each with a maximum power of 10 kW, the total power of the power station with full sun is therefore 30 kW. By participating in contributing to the network frequency regulation, this maximum is never reached (except in the case of full sun and a frequency well below 50 Hz). Rather, in this example the desire is to maintain a fixed power reserve of 4 kW, which can quickly be released in the event of a significant drop in the network frequency or of activation by the setpoint of said external signal.

In an initial state, the estimates of the MPPs of each inverter are considered to be known and equal to 6 kW for each inverter. The estimate of the overall MPP of the power station $MPP_{est\_total}$ is the sum of the estimated MPPs of the three inverters. $MPP_{est\_total}$ is therefore=18 kW.

During the first phase of the cycle, inverter OND1 is controlled to reach its MPP. It is expected to produce 6 kW, and we want to maintain 4 kW of upward reserve. It is therefore necessary to produce a total of 18 kW−4 kW=14 kW, in other words the 4 kW of reserve must be placed in inverters OND2 and OND3. By distributing the reserve equitably, in this example 2 kW of reserve is placed in each inverter (OND2 and OND3), therefore each receives a setpoint $P_{cons}$=4 kW for example. Other distribution solutions are possible, for example to optimize inverter efficiency. The total measured power is 14 kW, given that the estimate of the overall MPP is 18 kW. Indeed, the power MPP of the inverter 1 has not changed compared to its estimate. We therefore do indeed have 4 kW of reserve in theory, as follows:

OND1: MPP=6 kW and Pcons=MPP=MES1=6 kW,

OND2: MPP=6 kW, but Pcons=4 kW=MES2, and

OND3: MPP=6 kW, but Pcons=4 kW=MES3, where MES1+MES2+MES3=$P_{total}$=14 kW, while MPPoverall=18 kW, therefore 4 kW of reserve for this power station.

Going to the second phase, inverter OND2 is now operating at the MPP (instead of inverter OND1), and the reserve is now placed in inverters OND1 and OND3. In the example described, a difference between the estimated MPP and the measured power of inverter OND2 is observed: its MPP has changed and has become 6.5 kW. The new MPP value of inverter OND2 is then recorded at the end of this phase, in order to update the overall MPP and correct the setpoints of the next phase so as to maintain the 4 kW of reserve. At the end of the second phase, we have:

OND1: MPP=6 kW and Pcons=4 kW,

OND2: MPP=6.5 kW and Pcons=MPP=6.5 kW, and

OND3: MPP=6 kW and Pcons=4 kW.

Thus, $P_{total}$=14.5 kW and MPP overall=18.5 kW, and we therefore have 4 kW of reserve for this power station.

During the third phase, inverter OND3 goes to the MPP. One will note that its MPP is unchanged.

We therefore have at the end of this third phase:

OND1: MPP=6 kW and Pcons=4 kW,

OND2: MPP=6.5 kW, so that Pcons can be chosen to be Pcons=4.5 kW, and

OND3: MPP=6 kW and Pcons=6 kW.

We thus have $P_{total}$=14.5 kW and MPP overall=18.5 kW, again with 4 kW of reserve for this power station.

We then switch back to inverter OND1 at its MPP to restart the cycle, and update the MPP of inverter OND1 in the typical case where it has changed since its last measurement.

One will note with this cyclic algorithm of setting successive inverters to the MPP, that it is possible to maintain a volume of reserve in the power station while following the variations in the MPPs of the individual inverters and distributing an overall setpoint across all the inverters. The accuracy of the reserve varies with changes in the sunlight which result in changes to the MPP. It is therefore preferable to scan all the inverters cyclically and update all the MPPs regularly. Since the variations are slow, the accuracy of the MPP estimates is good and a chosen reserve can be guaranteed with satisfactory accuracy.

Figure 4A:
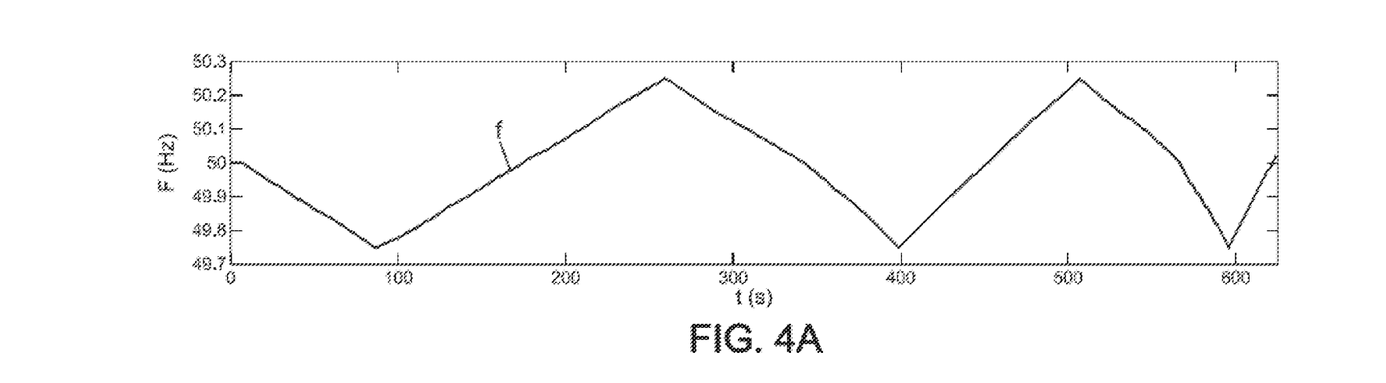
FIG. 4A illustrates a frequency variation in the electricity distribution network, as an input parameter for a management device of a three-inverter facility for which the output powers are illustrated in FIG. 4B (bottom of FIG. 4B for the individual powers delivered)
Figure 4B:
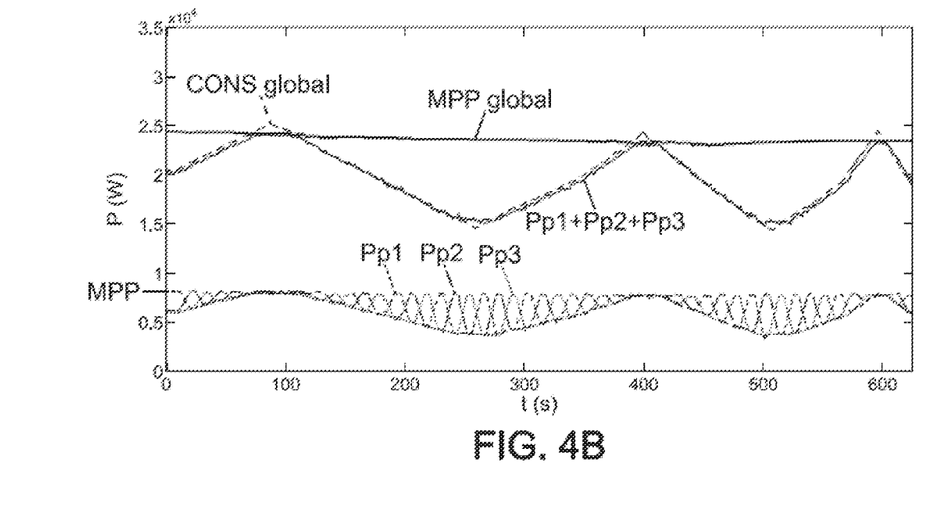

We now refer to FIGS. 4A and 4B to show a test of the method under real conditions, in a facility composed of three inverters (each with a maximum power of 15 kW), their power managed by a computer DIS (PLC) which sends active power setpoints to the inverters on the basis of power measurements received from the inverters. A frequency profile of the network f, in summary form, is used (FIG. 4A) to test the response of the facility (Pp1+Pp2+Pp3 corresponding to the sum of the powers produced by the set of three inverters) to frequency variations in the network. FIG. 4B confirms the satisfactory multi-inverter operation according to the method of the disclosure.

An analysis of this test clearly illustrates that the inverters are successively commanded, one by one, to go to the MPP in order to find their maximum power point and update the estimated MPP value kept in memory. On the curves of the individual power measurements for the inverters, there are ramps that the inverters follow to climb to and descend from their MPP in order to make the power transitions more gentle. This implementation of a "ramp" variation is described in detail below. Noise is low at the overall power level and the overall power follows the total setpoint with very little error at all times. The MPP estimation is correct, because at the times when the frequency is very low (at t=400 s and then just before 600 s in the example shown), the entire reserve is released (meaning that the power station is brought to the MPP), and the total power obtained (Pp1+Pp2+Pp3) is indeed the power anticipated and corresponds to the overall setpoint CONS overall, with very little error except at the maximum power demanded because it cannot exceed the sum of the $P_{MPP}$ of the three inverters.

Satisfactory operation of the frequency regulation is observed: the overall power does indeed respond to the frequency variations. When the frequency increases, the power decreases, and conversely when the frequency decreases, the power of the power station increases to support the network. The curve (Pp1+Pp2+Pp3) representing the variation in the overall power produced as a function of these frequency variations of the network does indeed follow the setpoint and thus shows that it is possible to achieve a regulation of good quality.

Specific embodiments are described in more detail below, as possible exemplary embodiments.

Controlling the power of the inverters is based on the principle of the cyclic method presented above with reference to FIG. 3. The control device DIS keeps a table or a vector of "tokens" in memory, which indicates at each moment which inverters are to go to the MPP and which are to provide the reserve. For example, if the first element of the vector Token(1)=1, then inverter OND1 is commanded to go to the MPP. If Token(1)=0, then the power of inverter OND1 is curbed and it receives a power setpoint for establishing part of the reserve of the power station. At the end of each phase of the cycle, the tokens are "redistributed" in order to change the distribution between inverters at the MPP and those providing the reserve. Those providing the reserve receive a setpoint precisely calculated so that the overall setpoint is achieved (as a function of the desired reserve, the maximum available power, and the frequency of the network). These calculations are detailed below. In addition, as introduced above, an additional feature called "smoothing transitions via setpoint ramps" is added to smooth the power transitions between "reserve" mode and "MPP" mode for each inverter, while ensuring that the overall setpoint is achieved at every moment. This feature is also detailed below.

In general, one will note three cases in which all inverters are forced to the MPP:

the first case concerns the initialization phase for collecting all the MPPs of all the inverters, the second case occurs when the estimated overall MPP is below a threshold predefined by the operator (insufficient available power for providing the reserve), and the third case occurs when the overall power setpoint is greater than or equal to the current overall MPP of the power station (therefore desiring the release of all available power, as previously illustrated in FIG. 4B at times 90 s, 400 s, and 590 s).

In this example, a cyclical scan of one of three inverters is presented. Other scanning strategies are possible for improving the MPP estimation or for obtaining the maximum controllable power at any moment. Some of these strategies may be based for example on measuring the DC voltage at the terminals of the panels. In addition, in the case of only two inverters for example (or respectively four inverters), one (respectively two) inverter(s) can be placed at its (their) MPP, while the other (the two others) follows (follow) an imposed power setpoint. In addition, each inverter can have its own MPP, different from the MPP of another inverter (because of the number of panels to which it is connected, or their deterioration).

FIG. 5 illustrates the algorithm corresponding to the details of an embodiment integrating the first initialization step S1, presented above. For a duration $T_{init}$, the inverters are all commanded to go to the MPP. The time $T_{init}$ must be long enough for the MPPs to stabilize (time necessary for the MPPT internal algorithm of each inverter to converge). This value depends on the inverter model and the manufacturer's specifications, but is about 10-20 seconds for today's commercial inverters. No reserve is established during this phase. At the start of the initialization ($t=t_0$), the first value of the variable $t_{end\_cycle}$ is defined. Initialization therefore ends as soon as the initialization time has elapsed, and the frequency regulation can actually begin in the following steps. The estimated values of the MPPs of each inverter were stored beforehand in the memory of the control device DIS. These values are updated in step S3 as soon as each "phase" of the cycle is complete (OK arrow exiting test S2), and a number k of inverters have been commanded to go to the MPP in order to obtain an updated value for their MPPs. The block diagram for this step S3 of updating MPP estimates is presented in FIG. 6 and discussed below, for a number N of inverters. In step S31 of FIG. 6, an inverter counter i is initialized (i=0). In test S32, as long as the counter i is less than the total number of inverters N (OK arrow), an update of the stored MPP values with measurements obtained during the last cycle is performed. If the counter i has reached the value N (arrow KO), then, in step S33, this MPP update routine can stop. Otherwise, in step S34, the counter i is first incremented (to designate a next inverter), then in step S35, a test is made to determine whether this inverter i is currently at its MPP, in which case (OK arrow-S35) the output power measured in this inverter Pmes(i) corresponds to its estimated MPP (MPPest(i)) and can be stored in memory in step S36. Otherwise (KO arrow-S35), the estimated MPP of the current inverter i remains unchanged, as it is currently stored in the memory of the device DIS (step S37).

Returning to FIG. 5, in step S4 (which follows the MPP update step S3), the cycle parameters are reset to prepare for the next phase of the cycle. The tokens are also redistributed to indicate the next inverters to be placed at their MPP. The previous value of the tokens is kept in memory in order to determine the inverters placed at the MPP in the previous phase of the cycle. In this step S4 the following is thus carried out:
redistribution of the tokens: as the state of the tokens in the previous phase was recorded and stored in memory, the tokens are redistributed by circular permutation (for example, for a four-inverter power plant with two tokens and two inverters at the MPP at a time, we would have 1001 that becomes 1100 where bit 1 defines an inverter to be placed at the MPP); and after defining the new tokens, the new slopes are calculated for the power transition smoothing ramps (calculation of new ramp parameters). This calculation is detailed below.

In step S5, the time variables defining the end of the ramp phase and the end of the inverter MPP update phase are redefined, as follows:

$t_{end\_ramp} = t + T_{ramp}$ $t_{end\_cycle} = t + T_{cycle}$

In particular, it is a matter of determining a time when a power smoothing ramp can be ended and a time when the MPP update can be considered as complete.

Of course, the cyclical distribution of tokens presented here is only one exemplary embodiment that can be used for managing inverters to reach the MPP. There are other possible implementations for redistributing tokens.

Moreover, as long as a cycle is not completed (KO arrow exiting test S2), the cycle parameters and the MPP estimates remain unchanged (step S6).

In step S7, the overall MPP of the power station is estimated by summing the estimates of the individual MPPs of the set of N inverters of the power station:

$$MPP_{overall\_est} = \sum_{inverters} MPP_{est}(i)$$

Next, in test S8, this value $MPP_{overall\_est}$ is compared to an activation threshold THR for the reserve procedure according to the disclosure (regardless of the equilibrium of the network frequency). If the maximum power $MPP_{overall\_est}$ is below this threshold THR (KO arrow exiting test S8), then in step S9 all the inverters are simply forced to operate at the MPP.

Otherwise (OK arrow exiting test S8), an overall power setpoint P(f), which can be lower than the maximum power $MPP_{overall\_est}$, is calculated in step S10 and depends on the frequency of the network f.

As an example of calculating P(f) for a primary frequency regulation, the overall setpoint is calculated from the total available power (estimation of the overall MPP), the desired "average" amount of reserve ($R_0$), and the network frequency measurement, in order to perform a primary frequency regulation as follows:

$Pcons_{total} = MPP_{overall\_est} - R_0 - H(f - f_0)$ (where $R_0$ and $H$ are greater than 0).

Saturation is added to this calculation in order to preferably respect the following limits:

$MPP_{est\_total} - 2R_0 \le Pcons_{total} \le MPP_{overall\_est}$

Such an embodiment makes it possible to ensure that the maximum power that can effectively be produced by the power plant cannot be lower than the given power setpoint (situation of FIG. 4B at 90 s, 400 s, etc.) and thus to maintain consistency between the power setpoint and the power actually produced. Thus, adjusting the value of H defines the "normalized" power of the power plant for frequency regulation. The overall power setpoint can increase in order to respond effectively to a decrease in frequency, and can decrease in order to respond to an increase in frequency.

Of course, this is just a simple example for frequency regulation with proportional gain. Other embodiments for frequency regulation are possible, for example with variable slopes and/or the addition of deadband. The overall setpoint can also be calculated as a function of an external signal coming for example from a network management entity requesting the release of more or less reserve at each moment.

As long as the overall power setpoint remains below the maximum possible production $MPP_{overall\_est}$ (OK arrow exiting test S11), the individual power setpoints CONS(i) are calculated and sent to the inverters in step S12, as follows, here preferably with a search for the power distribution of the non-MPP setpoint. Otherwise (KO arrow exiting test S11), all the inverters are forced to operate at the MPP in step S13.

In step S12 (detailed below with reference to FIG. 7), the individual powers are calculated so that the overall power actually delivered is equal to the overall power setpoint. They are also calculated so that the inverters going from a curbed setpoint to the MPP can gradually increase to the MPP (by following a smoothing ramp for the power transitions), and that the inverters that are "descending" from their MPP can also drop gradually to avoid power jumps. This implementation smooths the power transitions. This feature is detailed below.

To avoid sudden transitions of individual powers due to setpoint jumps (switching from a curbed power to the MPP and vice versa), a ramp is added to the power setpoints to "soften" these transitions. Indeed, for certain inverters, it has been observed that a power increase to reach the MPP can be faster than a power decrease from the MPP. For other models of inverters, it is possible for this trend to be reversed. In either case, this difference in the rate of variation to reach the MPP generates spikes in the overall power produced relative to the setpoint, which then should be attenuated. The effect of such ramps in the individual powers produced in the example of FIG. 4B (for powers Pp1, Pp2 and Pp3) can be observed. The aim of the ramps is that the overall power is always satisfied but the power transitions at the individual inverters are "gentler", while ensuring that the sum of the setpoints always equals the overall setpoint.

In one exemplary embodiment, the slope of each inverter is calculated as follows:

$$P\_ramp(i) = \frac{\Delta P(i)}{T\_ramp}$$

$\Delta P(i)$ is the difference between the MPP of inverter(i) and its power at the moment preceding the beginning of the ramp. In practice, it is calculated using the MPP estimate for the inverter (latest value stored in memory) and the latest power setpoint sent to the inverter. This calculation is done in step S4, presented above with reference to FIG. 5. For a set of inverters (possibly with several inverters climbing to the MPP at the same time as several inverters are descending from the MPP), each inverter climbing to the MPP receives a ramp setpoint before reaching its MPP, and the inverters that that are descending receive a setpoint which progressively decreases from the MPP to a curbed setpoint for the purposes of the reserve. At each moment, the setpoints are calculated to respect with the overall power of the power station.

The total ramp setpoint is also defined:

$$P\_ramp\_tot = \Sigma_{\substack{climbing \\ inverters}} P\_ramp(i)$$

At time t, if inverter i is in the process of climbing to its MPP, its new setpoint is given by the relation:

$$Pcons(i)(t) = MPP_{est}(i) - (t_{end\_ramp} - t - t_{samp}) * P\_ramp(i) \qquad (R1):$$

where $t_{samp}$ is the sampling time. This formula is valid regardless of the sampling time of the algorithm. The power reserve is ensured by the inverters that are not at the MPP. They each receive a setpoint, proportional to their MPP power, calculated so that the sum of the powers produced by the inverters respects the overall setpoint.

For an inverter that is not at the MPP, its power setpoint is given by the following relation:

$$Pcons(j) = \frac{Pcons\_overall - \Sigma_{\substack{inverters \\ at\ MPP}} MPP_{est}(i)}{MPP_{est\_total} - \Sigma_{\substack{inverters \\ at\ MPP}} MPP_{est}(i)} * MPP_{est}(j) \qquad (R2)$$

The estimated MPP values (stored in memory) are used to calculate the setpoints. Thus, with the assumption that the power setpoints are indeed achieved, the sum of the individual powers gives the overall power setpoint.

Furthermore, in order to compensate for the power ramp of the inverters that are climbing to the MPP, the setpoint of the inverters that are "descending" must be adapted so that at every moment the sum of the individual setpoints gives the overall setpoint. Thus, at time t, if inverter i is in the process of lowering its MPP in order to establish the reserve, its new setpoint is given by the relation:

$$Pcons(j)(t) = \frac{Pcons\_overall - \Sigma_{\substack{inverters \\ at\ MPP}} MPP_{est}(i)}{MPP_{est\_total} - \Sigma_{\substack{inverters \\ at\ MPP}} MPP_{est}(i)} * MPP_{est}(j) - \frac{(t_{end\_ramp} - t - t_{samp}) * P\_ramp\_tot}{\text{Number of inverters descending from the } MPP} \qquad (R3)$$

where $t_{samp}$ is a given sampling time.

By using these relations and summing the setpoints of:
inverters that are at the MPP,
inverters that are contributing to the establishing of the reserve,
inverters that are climbing to the MPP, and
inverters that are descending from the MPP,
we do indeed find that the sum of the setpoints is equal to the overall setpoint at time t.

FIG. 7 illustrates a flowchart for an algorithm corresponding to this processing, imposing the abovementioned ramps. After a step S131 of initializing an inverter counter i (i=0), a test S132 comparing i to the number N (where if i=N this routine ends in step S133), and incrementing i in step S134, it is first determined whether the token of the inverter i is equal to 1 (this inverter is to be brought to its MPP) in test S135. It is further determined whether the previous token JET-1(i) of this inverter (in the previous cycle) was already at 1, in tests S136 and S137. It is further determined whether the current time has exceeded a selected delay tramp in tests S138 and S139.

If the current token of inverter i is equal to 1, and if the previous token of inverter i is also equal to 1, then it is not necessary to carry out a power variation to be produced by this inverter i, and in step S140 its power setpoint Pcons (i) corresponds to its MPP.

If the current token of inverter i is equal to 1 but if in addition the previous token of inverter i was equal to 0, but the delay tramp has not yet elapsed, then in step S141 the inverter i is controlled to follow the ramp to its MPP with its power setpoint Pcons(i) calculated using relation R1. In this case, however, after the delay tramp is over, step S140 is applied, requiring inverter i to reach its MPP.

If the current token of the inverter i is equal to 0 while the previous token of the inverter i was equal to 1, then it is necessary for inverter i to "descend" from its MPP and a delay is applied until tramp. During this delay, in step 142 the power setpoint Pcons(i) of this inverter i is determined by the above relation R3 which depends on the imposed ramp. Then, once the delay is over, the power setpoint no longer depends on the imposed ramp and is determined by relation R2.

If the current token of the inverter i is equal to 0 and if the previous token of the inverter i was also equal to 0, then in step S143 its power setpoint Pcons(i) remains lower than the MPP and is determined by the previously given relation R2.

By implementing the disclosure, a photovoltaic farm composed of a plurality of inverters can participate in dynamic frequency support without adding storage or additional sensors, and without modifying the internal controllers of the photovoltaic inverters currently available commercially.

The algorithm for the cyclic estimation of the MPPs of the inverters makes it possible to dynamically estimate the overall MPP of the power station, and to follow MPP variations, while producing an overall power that is lower than the MPP of the power station, and thus precisely maintaining a volume of reserve (particularly if the dynamics of sunlight variations remain slow). Such a result is achieved without any knowledge model, or sensor, or modification of the internal controllers of commercially available PV inverters. Knowing the MPP at all times allows the manager of the electricity distribution network to know the volume of the reserve available for meeting distribution needs. A simple computing means (PLC or computer for executing the algorithm) comprising suitable communication buses (for communicating with the inverters, such as the interface INT of FIG. 2) allows implementing the disclosure in existing photovoltaic farms, as the inverters already have the capacity to receive active power setpoints and to return their active power measurements. Thus, some existing photovoltaic power stations (having inverters capable of receiving setpoints from an external device) can be easily adapted to perform frequency regulation without having to modify the inverters or the photovoltaic panels. The method of the disclosure can easily be adapted to work with any number of inverters (greater than two), and to work with inverters having different dynamic characteristics, different powers (by a simple adjustment to the parameters of the algorithm). The algorithm can be used for implementing other services requiring the management of photovoltaic production (other than contributing to balancing the network frequency).

TABLE OF REFERENCES

| | |
|---|---|
| OND: | INVERTER |
| CONS: | SETPOINT |
| DIS: | DEVICE |
| HOR: | CLOCK |

-continued

TABLE OF REFERENCES

| | |
|---|---|
| TEMPO: | DELAY |
| MPPglobal: | MPP overall |
| CONS global: | SETPOINT overall |
| MPP global: | MPP overall |
| MAJ MPP: | UPDATE MPP |
| $t_{fin\_cycle}$: | $t_{end\_cycle}$ |
| global: | overall |
| JET: | Token |
| mes: | measured |
| cons: | setpoint |
| rampe: | ramp |

The invention claimed is:

1. A method for controlling the electric power produced by a facility of photovoltaic panels in order to establish a power reserve, the facility comprising a set of N inverters for managing the power produced by said photovoltaic panels, the method, carried out iteratively on successive inverters among the set of N inverters, comprising:
   issuing respective setpoints to a number k of inverters among the set of N inverters, so that each produces a maximum power, the number k being less than the number N and the k inverters being determined for a given iteration of the method,
   obtaining, from the k inverters, measurements of the maximum power respectively produced by the inverters and storing in memory said measurements for the k inverters, said memory also storing N-k measurements obtained from N-k additional inverters during at least one prior iteration of the method,
   estimating, by reading the contents of the memory, a total maximum power able to be produced by the set of N inverters of the facility,
   obtaining information relating to an amount of reserve power to be established, and determining an overall power to be produced such that the difference between said overall power and said total maximum power corresponds to said amount of reserve power to be established,
   maintaining the setpoints of the k inverters so as to produce a maximum power, and issuing setpoints respectively to N-k additional inverters in order to produce a target power that is less than the maximum power, so that the sum of the N-k target powers and of the k maximum powers corresponds to said overall power to be produced,
   selecting from the N inverters one or more next inverters to replace the k inverters in a next iteration of the method.

2. The method according to claim 1, wherein a delay is applied between the issuing of the setpoints to the k inverters and the obtaining of the maximum power measurements of the k inverters, in order to take into account a latency in the search by each inverter for the maximum power that can be produced.

3. The method according to claim 1, wherein each setpoint issued to the k inverters for reaching the maximum power comprises a time ramp setpoint defining a rate of increase in the power produced by each of the k inverters.

4. The method according to claim 1, wherein, before issuing a target power setpoint to a given inverter, it is verified that said given inverter has received a maximum power production setpoint in the previous iteration of the method, and where appropriate the target power setpoint for this given inverter comprises a time ramp setpoint defining a rate of decrease in the power produced by this given inverter until the target power is reached.

5. The method according to claim 4, wherein each setpoint issued to the k inverters for reaching the maximum power comprises a second time ramp setpoint defining a rate of increase in the power produced by each of the k inverters, and wherein the rate of increase and the rate of decrease are chosen so as to maintain, across the set of N inverters, an overall produced power corresponding to said overall power to be produced.

6. The method according to claim 1, wherein each target power setpoint is determined so as to keep the same difference between the target power and the maximum power for all N-k additional inverters.

7. The method according to claim 1, wherein said power reserve of the facility is established in order to release all or part of said reserve as a function of a frequency deviation from a nominal frequency of an electricity distribution network to which the inverters are connected.

8. The method according to claim 7, wherein said information relating to an amount of reserve power to be established is a measured value of the frequency of the distribution network, said amount of reserve power to be established being calculated on this basis.

9. The method according to claim 7, wherein said information relating to an amount of reserve power to be established is a reserve-establishment setpoint received from a managing entity of the distribution network.

10. The method according to claim 1, wherein, in a next iteration of the method, k next inverters are selected from the N inverters in order to replace k previous inverters of a previous iteration, performing a cyclic permutation of k inverters at each iteration.

11. A non-transitory computer medium storage, storing instructions of a computer program causing the implementation of the method according to claim 1, when such instructions are run by a processor.

12. A computing device having a processing circuit comprising a processor for implementing the method according to claim 1, said processing circuit further including at least:
   an interface for communicating with the inverters, and
   a memory for storing measurements of maximum powers successively produced by the inverters.

* * * * *